May 26, 1936.     T. K. CUMMINS     2,042,090
CABLE CLAMP
Filed July 29, 1933
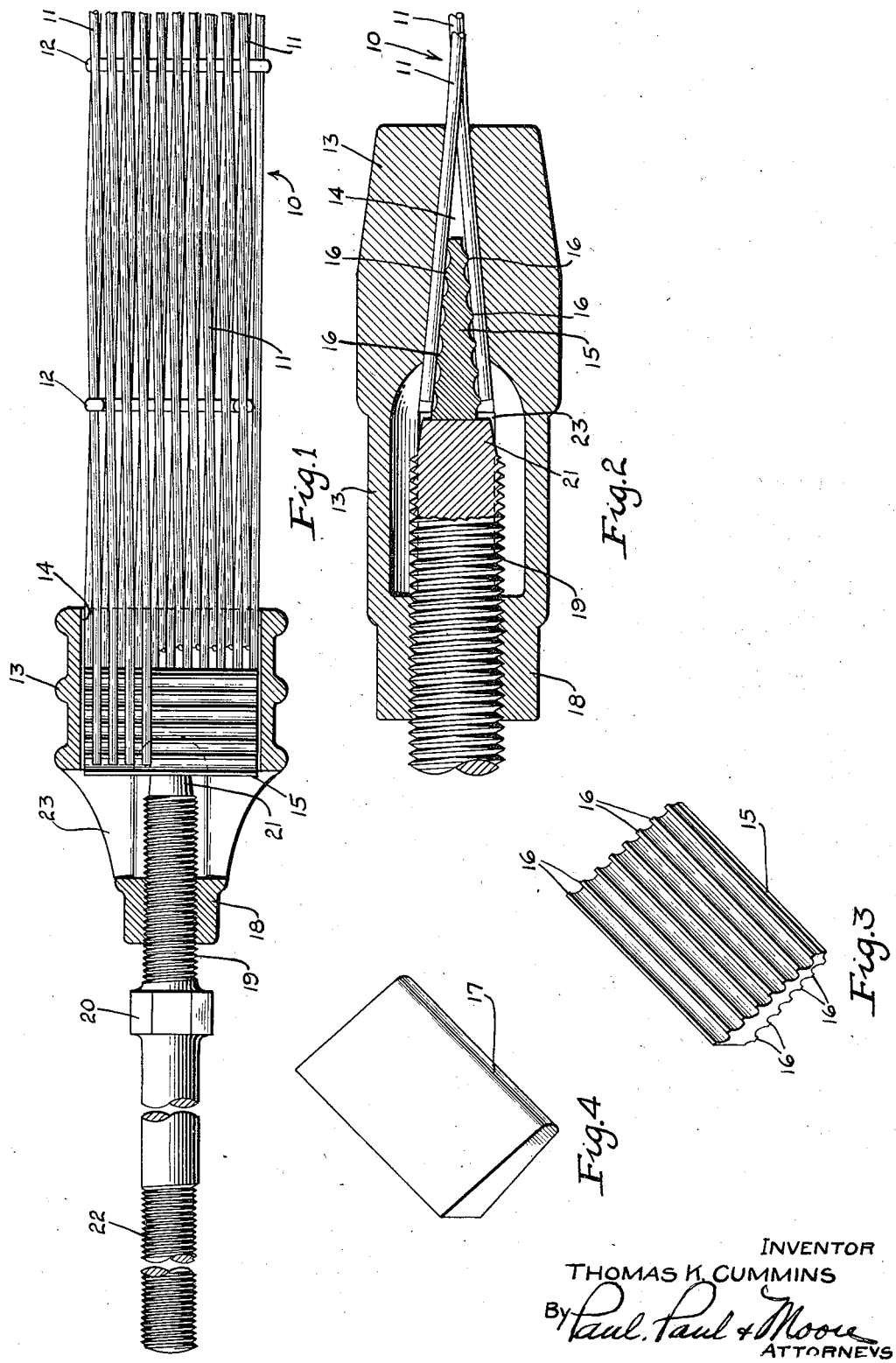
INVENTOR
THOMAS K. CUMMINS
By Paul, Paul & Moore
ATTORNEYS Patented May 26, 1936

2,042,090

UNITED STATES PATENT OFFICE 2,042,090

CABLE CLAMP

Thomas K. Cummins, St. Paul, Minn., assignor to Northern Malleable Iron Company, St. Paul, Minn., a corporation of Minnesota Application July 29, 1933, Serial No. 682,815

3 Claims. (Cl. 287—75)

It is the object of the present invention to provide a cable clamp of simple and inexpensive construction for securely anchoring the ends of flat-woven stranded cables such as are used as highway guard rails and for similar purposes.

Another object of the invention is to provide a cable clamp for the purposes stated comprising a recessed member and a clamping wedge adapted to be forced into the recess to clamp the strands of the cable between the wedge and the walls of said recess, the wedge being a relatively softer material than the cable strands so that as the wedge is driven into position the strands will imbed themselves in the wedge.

Still another object of the invention is to provide a clamp of the character above set forth in which the clamping wedge is provided with a plurality of ribs or projections extending transversely of the strands of the cable, thus providing a plurality of relatively narrow surfaces which may be indented by the cable strands when pressure is applied to the wedge.

Other objects of the invention and the advantages thereof will more fully appear as the description proceeds.

In the accompanying drawing, I have shown a practical embodiment of my invention. It is to be understood, however, that the drawing is illustrative merely and that I do not intend to limit my invention to the details of construction therein shown, as it will be clear to those skilled in the art that the invention may be embodied in other forms without departing from the scope thereof and without sacrificing any of its advantages.

In the drawing,

Fig. 1 is a vertical cross-sectional view through a cable clamp of my invention, showing a section of flat woven stranded cable held therein;

Fig. 2 is a horizontal cross-sectional view of the same structure shown in Fig. 1 but on a larger scale;

Fig. 3 is a detail view of the clamping wedge shown in Figs. 1 and 2; and

Fig. 4 is a detail view of a modified form of cable wedge.

Referring now to the drawing, reference numeral 10 indicates, generally, a flat woven stranded cable of the type which may be employed as a highway guard rail and for similar purposes. This cable comprises two rows of individual strands 11, the strands 11 of one row being disposed in interdigitating relation with respect to the strands of the other row, the rows of strands being held in position by means of suitable clips or retaining bars 12.

My invention aims to provide a clamp which will securely anchor the ends of a cable of the character above described. The clamp comprises a member 13 usually cast of malleable iron or similar enduring and relatively hard material. The member 13 is provided with a cable receiving recess 14 which, as best shown in Fig. 2, is of gradually increasing depth from the outer toward the inner end of the said member 13, so that the said recess is substantially triangular in cross-section. The strands 11 of the cable lie within said recess with the rows separated to contact the opposite faces or walls of said recess.

I provide a clamp wedge 15 which is adapted to seat in said recess between the rows of cable strands, the said wedge being of substantially triangular cross-section. It will be understood that when pressure is applied to the said wedge 15 to drive it into the cable receiving recess 14, the strands 11 of the cable will be firmly pressed between the faces of the wedge and the walls of the said recess.

As shown in Fig. 3, the wedge 15 is provided with a plurality of ribs or projections 16 on each of the clamping faces, which ribs or projections extend transversely of the cable strands 11. The purpose of these ribs or projections 16 is to provide relatively narrow edges or surfaces into which the strands 11 will imbed themselves when sufficient pressure is applied to the wedge. It will be understood that the member 13 and the wedge 15 are both cast and that in the casting there may be a certain amount of roughness or unevenness which cannot be entirely overcome in the finishing or smoothing up operations. Therefore, it would be likely that such unevenness would prevent uniform pressure on all of the strands of the cable with the result that the cable would not be as securely clamped as is required for the purposes for which the cable is used. This difficulty I overcome by providing the said ribs or said projections 16 and, as will be seen from Fig. 2, the strands 11 imbed themselves in said ribs or ridges when the wedge is driven into place.

Instead of employing the type of wedge shown in Figs. 1, 2, and 3, I may use a smooth faced wedge 17 as shown in Fig. 4. When a smooth faced wedge is used, it should preferably be made of a metal which is relatively softer than the cable strands 11 so that when sufficient pressure is applied to the wedge, the strands of the cable may imbed themselves in the surfaces of the wedge.

A further advantage flowing from the use of the types of wedges herein described is that a pull upon the cable outside of the clamp will cause the cable to draw the wedge more tightly into the recess.

The member 13 is provided with a threaded boss 18 for the reception of a driving screw or bolt 19. The bolt 19 is provided with a suitable noncircular portion 20 for the application of a wrench or other tool. The end 21 of the said screw or bolt bears against the wedge 15 so that, when the said bolt is screwed in, it will drive the wedge 15 into the recess 14 and toward the narrower end thereof. The opposite end of the bolt 19 may also be threaded as at 22 and this end may be passed through a fence post and a suitable nut applied so that the clamp will be secured to the post.

The member 13 is provided with an opening 23 into which the wedge 15 may be inserted until it is in alinement with the cable receiving recess 14.

The assembling the clamp and securing the cable therein, it will be understood that the wedge is removed and the bolt 19 is screwed outwardly so that the end 21 clears the inner edge of the boss 18, thus leaving the opening 23 unobstructed. The cable strands 11 are then inserted into the cable receiving recess 14.

Because of the way in which the cable is made, the rows of strands 11 will separate within the cable receiving recess to provide a substantially V-shape opening for the reception of the wedge 15. The wedge is dropped down through the opening 23 until it is in alinement with the cable receiving recess 14 and it may by slight pressure be forced into the said opening between the rows of cable strands 11. Thereupon the bolt 19 is screwed inwardly until the end 21 contacts with the wedge 15. As rotation of the screw is continued the wedge 15 is driven into tight engagement with the cable strands 11, thus pressing them firmly against the walls of the cable receiving recess. At the same time, the wedge being of relatively softer material than the cable strands, or being provided with the ribs or projections 16, the strands 11 will imbed themselves in the wedge when sufficient pressure is applied. Thus a secure and permanent union is made between the cable and the clamp. After the cable and clamp have been thus assembled and the strands of the cable imbedded in the wedge, a pull upon the cable outside of the clamp has the effect of drawing the wedge more tightly into the recess and into tighter engagement with the cable strands.

I claim as my invention:

1. A cable clamp for flat woven stranded cables comprising a body portion having a longitudinally extending tapering flat-walled cable-receiving recess adapted to receive separate layers of the cable strands, said body portion being also provided with a transverse opening, a clamping wedge adapted to be inserted in said transverse opening into alignment with said cable-receiving recess, and means for applying pressure on said wedge to drive it into said recess between the layers of cable strands to bring said strands into contact with the flat walls of said recess.

2. A cable clamp for flat woven stranded cables, comprising a body portion having a longitudinally extending tapering flat-walled cable-receiving recess adapted to receive separate layers of the cable strands, said body portion being also provided with a transverse opening, a clamping wedge adapted to be inserted in said transverse opening into alignment with said cable-receiving recess, and means for applying pressure on said wedge to drive it into said recess between the layers of cable strands to bring said strands into contact with the flat walls of said recess, said wedge being of relatively softer material than the strands of said cable whereby when the wedge is driven into position in said recess the strands will embed themselves in said wedge.

3. A cable clamp for flat woven stranded cables, comprising a body portion having a longitudinally extending tapering flat-walled cable-receiving recess adapted to receive separate layers of the cable strands, said body portion being also provided with a transverse opening, a clamping wedge adapted to be inserted in said transverse opening into alignment with said cable-receiving recess, and means for applying pressure on said wedge to drive it into said recess between the layers of cable strands to bring said strands into contact with the flat walls of said recess, said wedge having a plurality of transverse narrow ribs into which the strands of said cable will embed themselves when the wedge is driven into said recess.

THOMAS K. CUMMINS.